(12) United States Patent
Williams

(10) Patent No.: US 7,614,378 B2
(45) Date of Patent: Nov. 10, 2009

(54) FLEXIBLE SEAL AND MOLDED RIGID CHAMBER

(75) Inventor: Mark L. Williams, Gaines, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 11/728,633

(22) Filed: Mar. 27, 2007

(65) Prior Publication Data

US 2008/0236519 A1 Oct. 2, 2008

(51) Int. Cl.
*F02M 35/10* (2006.01)
(52) U.S. Cl. .................................. 123/184.21
(58) Field of Classification Search ............. 123/184, 123/184.21; 285/232, 328, 329, 404, 513, 285/235–237, 230; 96/388
See application file for complete search history.

(56) References Cited

U.S. PATENT DOCUMENTS

| | | | |
|---|---|---|---|
| 2,421,974 A * | 6/1947 | Vandervoort ................. 285/109 |
| 4,042,263 A * | 8/1977 | Harrison ..................... 285/110 |
| 4,315,630 A * | 2/1982 | French et al. ................ 277/625 |
| 4,420,057 A * | 12/1983 | Omote et al. ............... 180/68.3 |
| 5,134,977 A * | 8/1992 | Bagger et al. ............ 123/198 E |
| 5,341,773 A * | 8/1994 | Schulte et al. ......... 123/184.61 |
| 5,529,743 A | 6/1996 | Powell |
| 5,568,944 A * | 10/1996 | Kawasaki ................... 285/21.1 |
| 5,640,937 A * | 6/1997 | Slopsema ............... 123/198 E |
| 5,660,243 A * | 8/1997 | Anzalone et al. ........... 180/68.1 |
| 5,769,045 A * | 6/1998 | Edwards et al. ......... 123/184.61 |
| 6,660,199 B2 * | 12/2003 | Siferd et al. .................. 264/150 |
| 6,722,708 B2 * | 4/2004 | Morohoshi et al. ........... 285/423 |
| 7,017,953 B2 * | 3/2006 | Benscoter et al. ............ 285/401 |
| 7,165,310 B2 * | 1/2007 | Murakami et al. ............. 29/505 |
| 2005/0001429 A1 * | 1/2005 | Abercrombie Simpson . 285/382 |

* cited by examiner

*Primary Examiner*—Stephen K Cronin
*Assistant Examiner*—Keith Coleman
(74) *Attorney, Agent, or Firm*—Harness, Dickey & Pierce, PLC

(57) ABSTRACT

A connection between an expansion chamber outlet and a rubber cuff that accommodates an inlet portion of a throttle body exhibits a dovetail connection between an expansion chamber wall and the rubber cuff such that the expansion chamber has a dovetail recession while the rubber cuff has a dovetail projection. The rubber cuff is insert molded around the expansion chamber outlet such that the joined interface between the rubber cuff and the expansion chamber is from the molding. The dovetail prevents separation due to air forces through the chamber and cuff. A cuff groove opposite the dovetail projection, on a cuff inside diameter, receives a protuberance of the throttle body inlet portion. A band clamp fits around the outside diameter of the cuff, adjacent the throttle body inlet protuberance, to prevent movement of the throttle body. The cuff has a projection(s) to also prevent slippage of the throttle body.

7 Claims, 4 Drawing Sheets

FLEXIBLE SEAL AND MOLDED RIGID CHAMBER

FIELD

The present disclosure relates to a vehicle air induction system and more particularly, to an interconnection of an insert-molded expansion chamber and cuff of a clean air duct.

BACKGROUND

The statements in this section merely provide background information related to the present disclosure and may not constitute prior art. Air induction systems typically utilize clean air ducts to convey filtered air from an airbox assembly to a throttle body, before delivering the filtered air to a vehicle engine. The clean air duct must be closed to the outside environment to prevent false air from entering the system. False air is any air that enters the system through leaks created within a part or at assembly interconnections of the parts of the system.

Historically, clean air ducts have been molded completely from rubber or rubber alternatives. While such a manufactured product allows for relatively easy attachment to the airbox and throttle body, it also causes concerns related to excess weight and duct integrity or collapsibility. Recent developments have improved upon the complete rubber design by making use of overmolding technology to create a combination blow molded duct with overmolded rubber cuffs. While such a duct results in a lighter duct, the combination of blow molding and overmolding does not allow for tight or close part tolerances. In overmolding, a die must close securely around the blow molded part with no air leaks thus requiring the use of a mandrel inserted into the part to center it and use of a ledge and space around the part circumference to clamp the rigid part prior to overmolding. In order to incorporate the necessary ledge, a part designer must provide additional length in the part design. This additional length may result in space between the blow-molded and overmolded parts. Tight packaging within current automotive vehicles requires that an alternative configuration be developed to achieve the desired performance in a smaller package. Noise, vibration and harshness ("NVH") concerns must also be considered with any clean air duct designs. Forceful turbulent air entering the induction system may generate an undesirable "whoosh" or "whistle" noise as a result of the forceful air moving through the clean air duct. Thus, the new configuration must be securely held together and be resistant to separation due to the air forces.

FIG. 6 depicts a connection 100 of a blow molded clean air duct 102 that has an overmolded cuff 104 mated at the interface 110. Finally the cuff 104 is pressed onto the throttle body 106 as part of the connection 100. In the prior art connection 100, a gap or space 108 remains due to the mandrel utilized in the overmolding process. Such space 108 utilizes valuable space necessary under the hood of today's automobiles for various vehicle and engine systems.

What is needed then is a device that does not suffer from the above disadvantages. This, in turn, will provide a device with an interconnection or joint between an expansion chamber and a clean air duct cuff that is capable of withstanding the forces due to internal airflow and overpressure of the intake system, and that can be made efficiently and compactly without spaces remaining after tooling withdrawal. Additionally, the part should easily and securely join to a throttle body and provide flexibility in response to the force of airflow.

SUMMARY

An engine air induction system delivers clean air through a throttle body to the engine while providing noise attenuation with minimal power loss by use of an insert molded clean air duct. A dovetail connection exists between an expansion chamber outlet wall and a rubber cuff, which accommodates an inlet portion of a throttle body. The expansion chamber wall may have a dovetail recession while the rubber cuff may have a dovetail projection. Because the rubber cuff is insert molded around the expansion chamber outlet, the interface between the rubber cuff and the expansion chamber, including the dovetail interface, is one of insert molding.

The dovetail joint between the expansion chamber and cuff prevents separation due to air forces of the air passing through the air induction system en route to the engine. A groove in the cuff, on a side of the cuff opposite of the dovetail projection, receives a protuberance of a throttle body inlet portion. A band clamp fits around the outside diameter of the cuff adjacent and also beside the throttle body inlet protuberance to prevent movement of the throttle body when the clamp is tightened. The cuff may also have a nub or nubs, and/or a ring or rings molded into the inside diameter of the rubber cuff to prevent slippage of the throttle body inlet portion from the rubber cuff.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
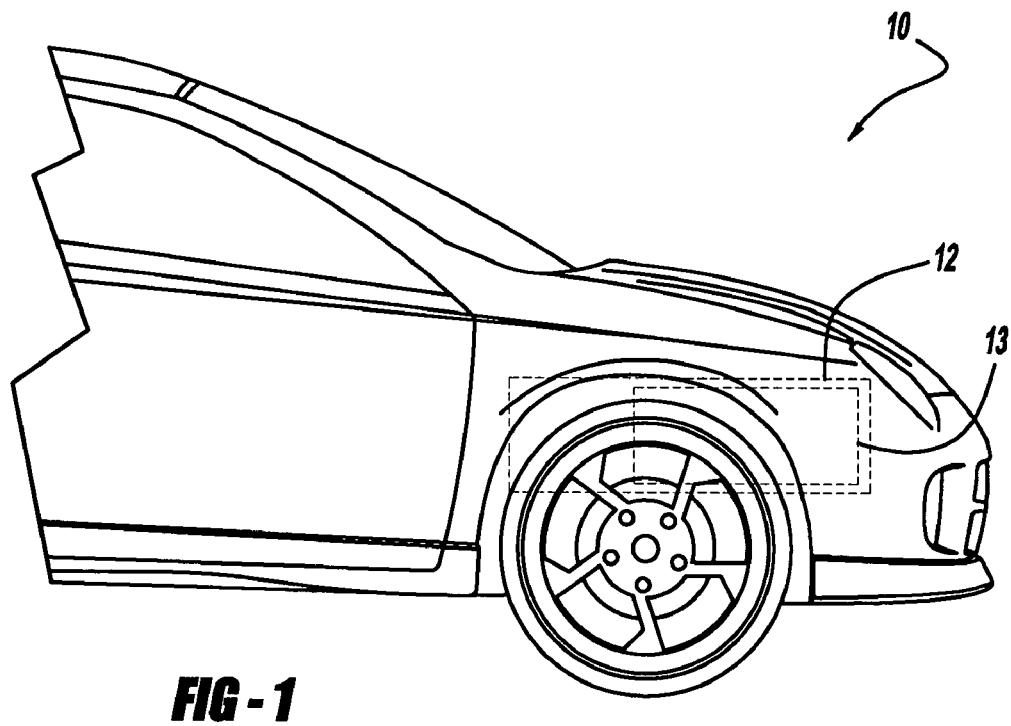
FIG. 1 is a perspective view of an exemplary vehicle front end depicting the location of an engine, including the duct of the present teachings.
Figure 2:
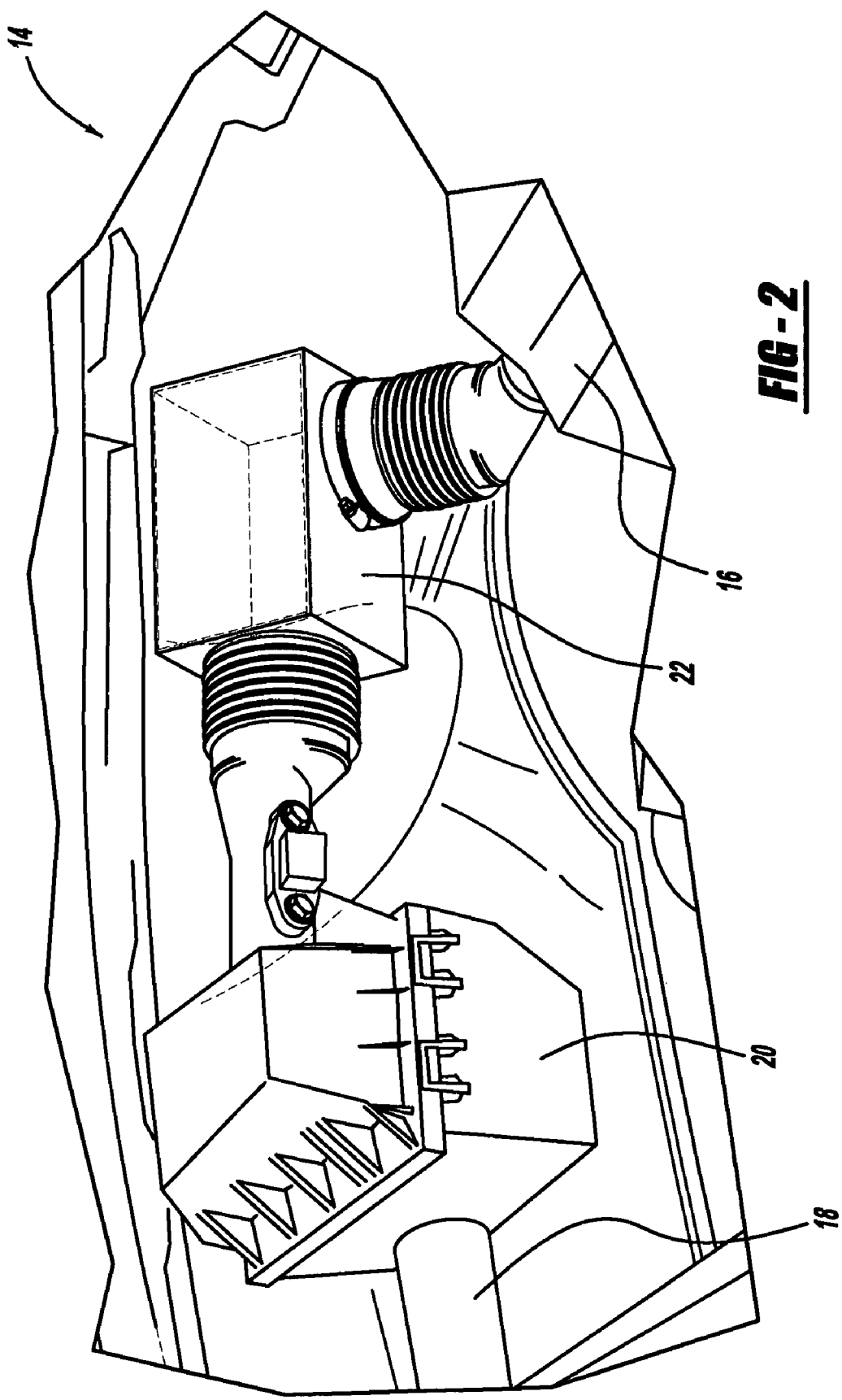
FIG. 2 is a cutaway view of an exemplary vehicle air induction system in accordance with teachings of the present invention.

The following description is merely exemplary in nature and is not intended to limit the present disclosure, application, or uses. With general reference to FIGS. 1-5, the teachings of the present invention will be explained. A typical front end of a representative automotive vehicle 10, includes an underhood compartment 12 for packaging vehicular components. The components of the underhood compartment 12 typically includes a compact array of parts necessary to proper functioning of the vehicle 10, such as an engine 13, an air induction system 14, and more. With reference to FIGS. 1 and 2, the air induction system 14 delivers filtered air to a throttle body 16, which in turn is used in combustion within the vehicle engine 13. The air induction system 14 employs an air duct 18, also known as a fresh, outside or "dirty" air duct, an air intake chamber or airbox assembly 20, and a clean air duct 22. During operation, unfiltered air enters the air induction system 14 through the fresh air duct 18 and passes through a filter located in the airbox assembly 20. The filtered air then travels from the airbox assembly 20 to the clean air duct 22 and then into and inlet portion of the throttle body 16. The throttle body 16 meters the filtered air before allowing it to enter the vehicle engine 13. Based upon driver demand, the throttle body 16 controls the volume of air entering the engine 13.

Figure 3:
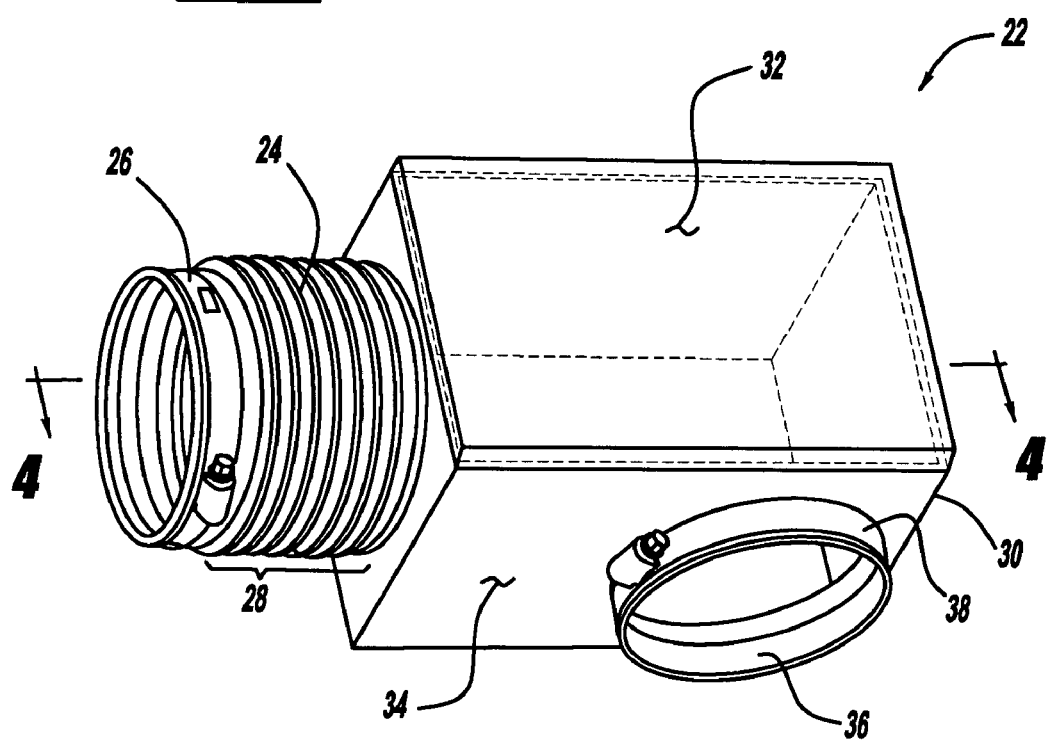
FIG. 3 is a perspective view of a clean air duct in accordance with teachings of the present invention.
Figure 4:
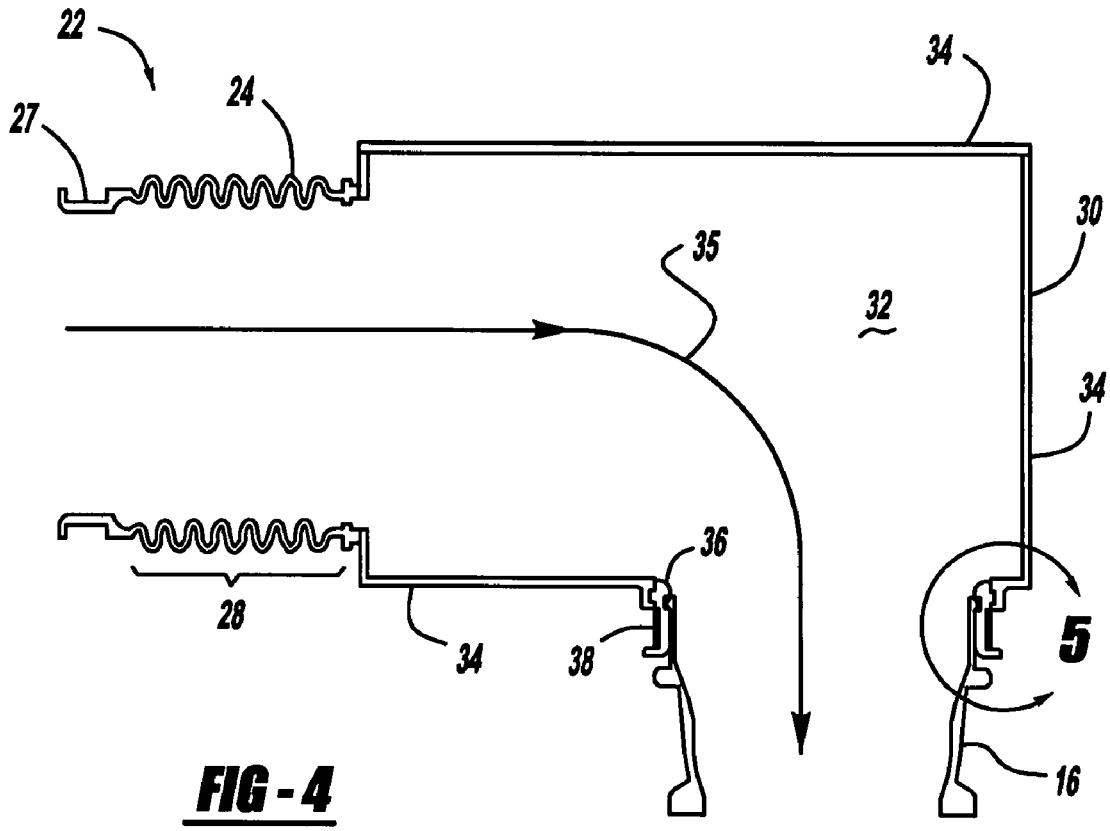
FIG. 4 is a cross-sectional view of the clean air duct of FIG. 3 taken along line 4-4.

Referring now to FIGS. 3 and 4, the clean air duct 22 will be described in greater detail. The clean air duct 22 may have an accordion style, or longitudinally compressible rubber duct 24 that may be securely attached to the airbox assembly 20 by a clamp 26, that fits around a groove 27 in the rubber duct 24. Convolutes 28 may be included in the design and structure of the rubber duct 24 to allow for tolerance concerns, such as if the rubber duct 24 and the airbox are not perfectly in alignment. Periods of misalignment may occur during engine roll, as may be experienced during engine starting and periods of engine operation, such as acceleration. The number and size of the convolutes 28 may be system specific.

Continuing with reference to FIGS. 3 and 4, the rubber duct 24 may be attached directly to an injection molded expansion chamber 30 by a molding process. The expansion chamber 30 may have a top section 32 and a body section 34, both walls, joined by a welding process to create the final expansion chamber 30 shape. Further, the expansion chamber 30 may be connected to a rubber cuff 36 by insert molding. The rubber cuff 36 may be used to connect the clean air duct 22 to the throttle body 16, while the rubber cuff 36 may be held securely to the throttle body 16 by a clamp 38.

With reference now primarily to FIG. 4, the airflow 35 through the clean air duct 22 is depicted. More specifically, turbulent air flows from the airbox assembly 20 and into the rubber duct 24. As the airflow enters the rubber duct, a turbulent air component causes an acoustic pulse, which is desired to be attenuated, to propagate through the system. Such sound waves propagating through the air induction system 14 may be reduced by using an expansion chamber or Helmholtz tuner. Expansion chambers and Helmholtz tuners reflect sound waves back toward the source canceling out the sound wave from the source in the process. In one example, the expansion chamber 30 is utilized to attenuate any noise (sound waves) propagating through the air induction system 14.

Figure 5:
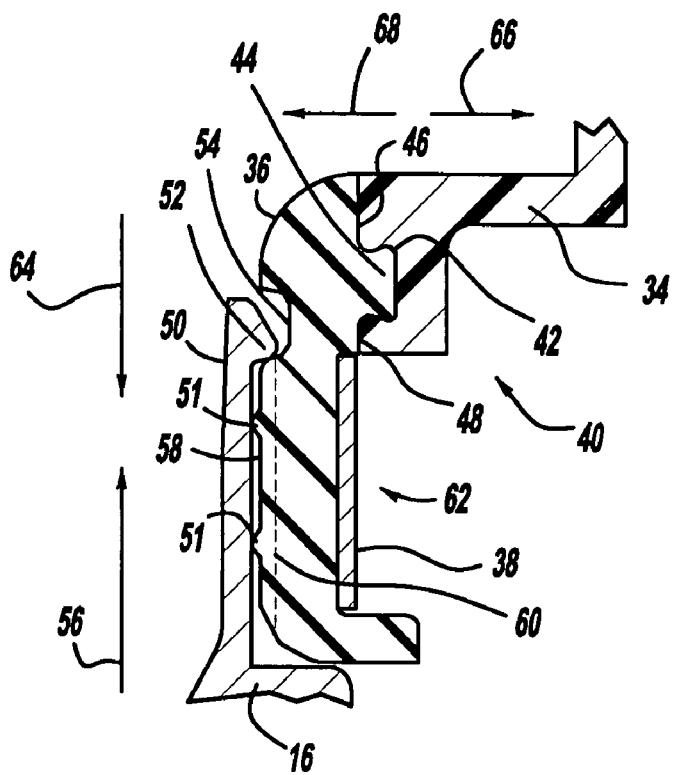
FIG. 5 is an enlarged, cross-sectional view of the juncture of the expansion chamber of the clean air duct and a throttle body inlet in accordance with teachings of the present invention.

Continuing now with reference to FIGS. 4 and 5, an explanation of the expansion chamber 30 and rubber cuff 36 interconnection will be provided. The expansion chamber 30 may be manufactured by injection molding plastic into a desired configuration. As depicted, a rectangular or box shape is utilized as an example for the present teachings, but it should be understood that other configurations may be utilized to meet fit and function requirements. The expansion chamber 30 of the present invention is molded in at least two separate pieces, a top section or cover 32 (FIG. 3) and a body section 34, which includes a portion of a dovetail joint 40. The expansion chamber 30 material may be a polypropylene, a polyamide or any equivalent material that meets underhood temperature and durability requirements. In one example, a polyamide material may be necessary to withstand the expected underhood temperature conditions. Furthermore, the expansion chamber 30 may maintain a tight tolerance defined by the injection tooling and part cooling time. In one example, injection molded polyamide is used in an injection molded process to manufacture the expansion chamber 30.

Continuing with the manufacturing of the clean air duct 22 of FIGS. 4 and 5, the cuff 36 may first be made by injection molding and then be inserted into molding tooling so that the body section 34 may then be molded around the cuff 36 to achieve the desired finished part with the body section 34 and cuff 36 joined. The cuff 36 may be a rubber or synthetic material such as ethylene propylene diene monomer rubber ("EPDM") or Santoprene™, a thermoplastic rubber. For this example, santoprene may be suitable because of its temperature-withstanding properties and its overall durability when subjected to clamping and in-service part forces.

Continuing with FIG. 5 and the description of the juncture of the body section 34, the rubber cuff 36, and additionally the throttle body 16, the body section 34 defines a recession 42 in the shape of a dovetail, while the rubber cuff 36 defines a corresponding projection 44 in the shape of a dovetail. When the dovetail projection 44 and dovetail recession 42 are mated together, such as during an insert molding process, they form the dovetail joint 40. Upon insert molding the body section 34 to the santoprene cuff 36, and thus creating and maintaining the dovetail joint 40, an inboard juncture surface 46 and an outboard juncture surface 48 are formed. The inboard juncture surface 46 and an outboard juncture surface 48 are on opposite sides of the dovetail joint 40 and are mated to form a seal that effectively prevents air from passing from inside the expansion chamber 30, to outside the expansion chamber or from outside the expansion chamber 30 to inside the expansion chamber.

FIG. 5 also depicts the securement of an inlet portion 50 of the throttle body 16 within the inside diameter of the rubber cuff 36. More specifically, the inlet portion 50 has a protuberance 52 that resides within a cuff groove 54 when the throttle body 16 is inserted within the cuff 36. To secure the throttle body 16 within the cuff 36, the throttle body 16 is moved in accordance with direction arrow 56 such that the protuberance 52 actually contacts the inside diameter 58 of the cuff 36 until it reaches the cuff groove 54. As the protuberance 52 contacts the inside diameter 58 of the cuff 36, the inside diameter 58 may undergo compression to the extent indicated by compression boundary 60. Furthermore, the cuff 36 may have one or more small, protruding nubs 51 that project from the inside diameter 58 of the cuff 36. Alternatively, the nub 51 may actually be a continuous protruding ring about the inside diameter of the cuff 36. The ring or nubs 51 provide another, increased friction point for the throttle body 16 inlet portion 50 to further secure the inlet portion 50 against the cuff 36. The friction is heightened because the nubs 51 are in a state of compression resistance with the inlet portion 50, to a degree greater than the cuff inside diameter 58 itself. When the protuberance 52 reaches the cuff groove 54, the cuff inside diameter 58 is restored to its pre-compressed diameter. As a result of the restoration, the protuberance is securely lodged within the groove 54 to prevent inboard and outboard movement (in accordance with the direction arrows 56, 64) of the throttle body inlet portion 50.

To provide added security that the protuberance 52 remains within the groove 54, the circular clamp 38 (see also FIG. 3) may be drawn tight around the cuff 36 and the inlet portion 50, which may result in compression of the cuff 36 because the clamp 38 provides a clamping force that is perpendicular to the airflow 35 through the inlet portion 50. Continuing, the airflow 35 through the clean air duct 22 results in a series of forces about the dovetail joint 40. More specifically, the airflow 35 causes a force in accordance with the direction of arrow 64 and arrow 66. Arrow 56 and arrow 68 depict the direction of counteracting forces of the structure 34, 36. Elaborating on the forces, the force represented by arrow 64 acts upon the throttle body 16 and is resisted by the protuberance 52 and groove 54 in accordance with the direction of arrow 56. The airflow 35 also acts upon the body section 34 with a force in accordance with arrow 66 which is countered by the dovetail joint 40 in accordance with arrow 68. The flat dovetail joint also assists in countering the force 64 so as to maintain the integrity of the mated surfaces 46, 48.

There are multiple advantages of the structure described above. First, the connection of the body section 34 of the clean air duct 22 leaves no gaps between any of the parts due to tooling removal, as is evidence in FIG. 6 of the prior art, by gap 108. By insert molding the body section 34 and cuff 36, such gap may be eliminated. Second, the dovetail joint 40 provides a connection such that the body section 34 will not separate from the cuff 36 as forceful airflow 35 passes through the clean air duct 22 and into the throttle body 16. Additionally, the protuberance 52 of the throttle body 16 fits securely into the groove 54 of the cuff 36, and thus the protuberance pulls longitudinally on the cuff 36 (FIG. 5) due to the airflow acting on the inlet portion 50. In the prior art of FIG. 6, the forces of the airflow may operate to separate part of the cuff 104 from the clean air duct 102. More specifically, with reference to FIG. 6, as the airflow 112 moves into the throttle body 106, the protuberance 114 puts a force on the cuff 104 which may hasten the separation of the overmolding interface 116, and in more extreme cases, at the interface 110. Such is not possible with the structure of the present teachings depicted in FIG. 5 because the protuberance 52 does not act to separate at an interface of parts 36, 34, but rather only places a force directly on the cuff 36.

Figure 6:
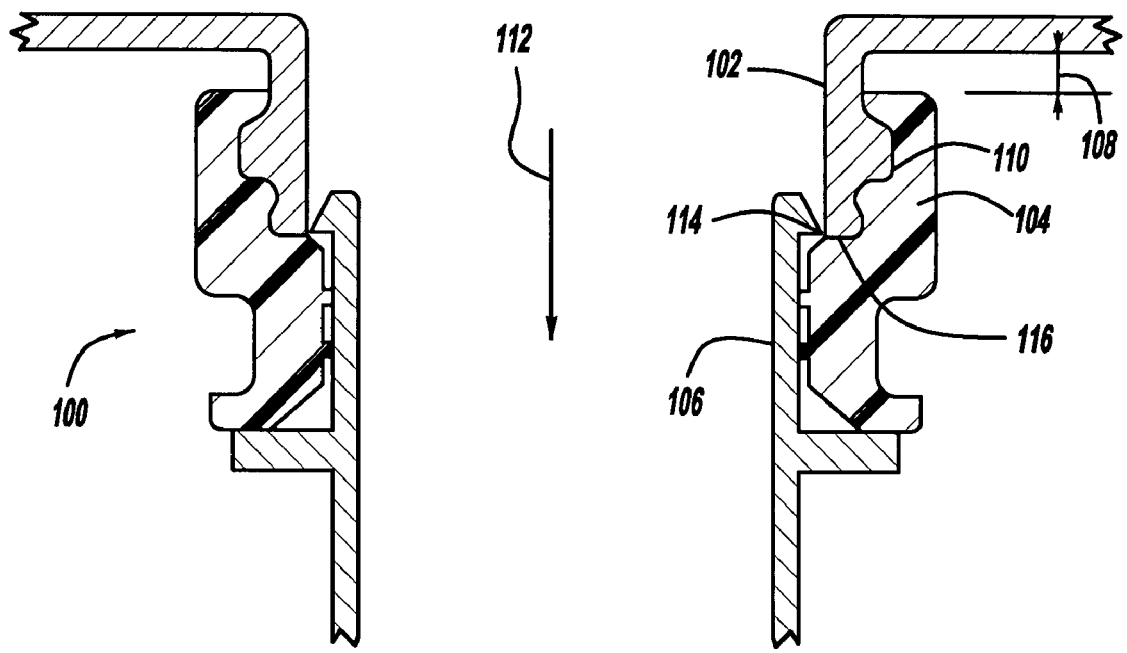
FIG. 6 is a cross-sectional view of a juncture of a throttle body to a body section of a clean air duct of the prior art.

Continuing, the dovetail joint 40 of FIG. 5 prevents separation by creating a molded, interlocking dovetail structure that resists separation, instead of merely a non-interlocking, surface to surface interface as in FIG. 6. Moreover, the process of insert molding the body section 34 onto the rubber cuff 36 is an advantage over the previously used overmolding process that required tooling gaps 108 or spaces between molded parts. Such a gap consumes valuable engine compartment space. The elimination of the gap 108 also permits the cuff 36 to be extended to the inside diameter area of the body section 34 structure, as opposed to the outside diameter area of the clean air duct 102, as depicted in FIG. 6.

Continuing with advantages of the invention, the location of the groove 54, which is located on an inside diameter of the cuff 36, adjacent and opposite of the dovetail joint 40, which is located in an outside diameter of the cuff 36, exhibits another advantage. Specifically, because the groove 54 is located nearly directly opposite the dovetail joint 40, when any force from the protuberance 52 of the throttle body 16 is subjected within the groove 54, the proximately located dovetail joint 40 is able to counter such force than if the groove were located in another area of the cuff 36. Furthermore, with reference to FIG. 5, the bottom of the groove 54 is located at or just slightly above the top of clamp 38, which is located on an outside diameter of the cuff 36. Thus, when the clamp 38 is tightened, the protuberance 52 of the inlet portion 50 is prevented from moving and the throttle body 16 is secured.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine air induction duct connection comprising:
   a cuff, in cross-section, defining a symmetrical dovetail projection, the cuff and entire dovetail projection being a single rubber material, the dovetail projection located on an outside diameter of the cuff and perpendicular to a cuff longitudinal axis, the dovetail projection having a flat annular dovetail surface that is more distal from the cuff longitudinal axis and wider than a section of the dovetail that is between the longitudinal axis and the flat annular dovetail surface, the cuff further defining a groove formed into an inside diameter of the cuff and a clamp groove formed into the outside diameter of the cuff;
   a throttle body inlet defining a protuberance that resides within the groove;
   a nub integrally formed with the cuff, the nub protruding from the inside diameter of the cuff that contacts the throttle body inlet;
   a clamp, the clamp located within the clamp groove on the outside diameter of the cuff opposite to the protruding nub to provide a concentrated force at the nub on the throttle body inlet; and
   a duct wall, in cross-section, defining a dovetail recession in an inside diameter of the duct wall, the dovetail recession having a flat annular dovetail surface that contacts the flat annular dovetail surface of the cuff, wherein the entire dovetail projection of the cuff interlocks with the recession of the duct wall the cuff prevents contact between the throttle body inlet and the duct wall, and the groove is located adjacent to the dovetail.

2. The connection of claim 1, wherein the clamp location is beside the groove such that the clamp prevents movement of the throttle body in the groove.

3. An engine air induction duct connection comprising:
   an expansion duct connection interface defining, in cross-section, a dovetail recession that has its widest dovetail recession dimension parallel to its most distal dovetail recession annular surface;
   a cuff connection interface defining, in cross-section, a dovetail projection perpendicular to a cuff longitudinal axis of a cuff, the dovetail projection located on an outside diameter of the cuff and having an end and a base, the end being wider than the base, the dovetail recession receiving and interlocking with the dovetail projection, wherein the cuff further comprises an inside diameter groove within an inside diameter of the cuff, a protruding ring about the inside diameter of the cuff and a band groove on an outside diameter of the cuff;
   an expansion duct inboard juncture surface residing on one side of the dovetail projection;
   an expansion duct outboard juncture surface residing on an opposite side of the dovetail projection, the inboard and outboard juncture surfaces contacting the cuff;
   a throttle body inlet portion, wherein the throttle body inlet portion resides against the protruding ring and has a protuberance that resides within the inside diameter groove of the cuff; and
   a band that resides within the band groove on an outside diameter of the cuff to apply a concentrated force to the throttle body inlet at the protruding ring, wherein the cuff prevents contact between the throttle body inlet and the duct wall.

4. The connection of claim 3, wherein the expansion duct connection interface and the cuff connection interface is an insert molded interface.

5. An engine air induction duct connection comprising:
   an expansion duct defining a symmetrical dovetail recession that, in cross section, has its widest dovetail recession dimension parallel to its most distal, flat dovetail recession surface; and a rubber cuff defining a symmetrical dovetail projection attached to and perpendicular to a cuff outside diameter, the dovetail projection including an end and a base, the end being wider than the base, the dovetail recession receiving and interlocking with the dovetail projection, wherein the cuff further defines a groove on a cuff inside diameter adjacent the dovetail projection, wherein the groove accommodates a protuberance of a throttle body inlet portion and the cuff is located between the throttle body inlet portion and the expansion duct to prevent contact between the throttle body inlet portion and the expansion duct, wherein the cuff further comprises a protruding portion on the cuff inside diameter that contacts the throttle body inlet portion to secure the throttle body inlet portion.

6. The connection of claim 5, wherein the rubber cuff further defines a clamp groove on an outside diameter of the cuff, beside the dovetail projection.

7. The connection of claim 6, wherein the clamp groove is non-overlapping of the groove on the inside diameter of the cuff.

* * * * *